July 18, 1950     F. ARBOGAST     2,515,175
LEADER FOR FISHLINES AND METHOD AND
APPARATUS FOR SHAPING THE SAME
Filed Jan. 19, 1946

INVENTOR
*Fred Arbogast*
BY
*William Cleland*
ATTORNEY

Patented July 18, 1950　　　　　　　　　　　　　　　2,515,175

UNITED STATES PATENT OFFICE 2,515,175

LEADER FOR FISHLINES AND METHOD AND APPARATUS FOR SHAPING THE SAME

Fred Arbogast, Akron, Ohio; Nellie E. Arbogast, executrix of said Fred Arbogast, deceased, assignor to Fred Arbogast and Company, Inc., Akron, Ohio, a corporation of Ohio Application January 19, 1946, Serial No. 642,146

8 Claims. (Cl. 18—19)

This invention relates to leaders of the type utilized for attaching a fishline to a lure.

In the past various types of synthetic "gut" materials have been utilized for such leaders, which in the simplest form thereof usually comprises a length of the material formed with a small loop at an end, this loop being made by doubling the end portion of the material and tying a suitable non-slip knot. The material used for this purpose preferably is translucent, strong, flexible and waterproof, and in use as a leader is capable of withstanding temperatures up to at least 100° C. without softening materially. One example of a suitable material falling within this category is known as nylon. This material in thread-like form, however, when formed and knotted to provide a leader loop, in the normal manner, produces a loop which is substantially circular in form or which has a rounded outer end of relatively large radius, and when tension of a fishline is applied as in normal use, the loop will break at the point where the fishline is attached. For this reason, in the past, material of the nylon type has been unsatisfactory for use in certain types of fishline leaders.

An object of this invention is to provide an improved fishline leader of relatively stiff, flexible material having the usual characteristics of a gut leader, the same being capable of withstanding heat up to substantially above 100° C. without softening, and having formed therein an attaching loop of improved shape whereby the loop will possess maximum resistance to breaking thereof at the point of attachment thereto of a fishline or the like.

Another object of the invention is to provide improved apparatus and procedure for manufacturing a leader of the character described in the last paragraph.

These and other objects of the invention will be manifest from the following brief description and the accompanying drawings.

Figure 1:
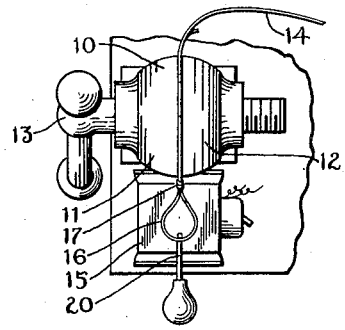
Figure 1 is a top plan view of apparatus for producing leaders in accordance with the invention, and illustrating a stage in the procedure prior to forming a loop in a leader to finished shape thereof.
Figure 2:
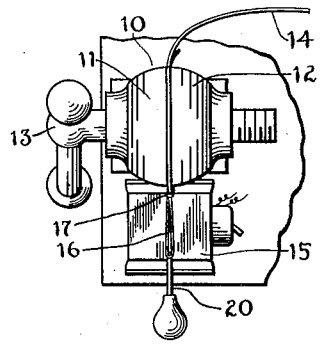
Figure 2 is a similar plan view of the same illustrating a stage in which the loop has been formed to finished shape.
Figure 3:
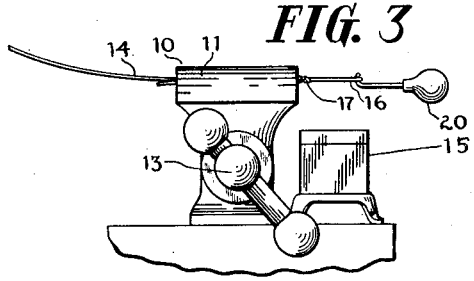
Figure 3 is a side elevation of Figure 2, as viewed from the left thereof.
Figure 4:
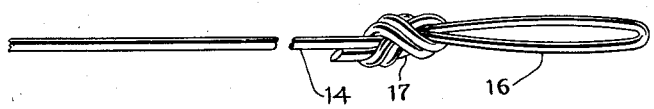
Figure 4 is an enlarged top plan view, partly broken away, illustrating a leader provided with the improved loop, in accordance with the invention.

Referring particularly to Figure 1 there is illustrated a clamping device 10, including a pair of jaws 11 and 12 provided with a handled screw 13, for relatively moving the same to engage and securely hold a leader 14 to be worked upon. A relatively small electrical heating unit 15 is mounted at one side of the vise for a purpose to be described subsequently.

In carrying out the method of the invention a length of threadlike filament constituting the leader 14, is provided with a relatively small closed, circular loop 16 formed by tying or knotting a doubled end of the filament, as indicated at 17. The material of the filament may be nylon or other linear polyamide which has certain requisite characteristics of a gut leader, that is, which is translucent, hard but flexible, resilient, and strong compared with relative fineness of the filament, and which also has the quality of being capable of withstanding temperatures up to 100° C. and somewhat higher without becoming materially softened. One such type of nylon produced by the condensation of hexamethylene diamine and adipic acid, for example, has been found satisfactory for this purpose, but due to the inherent springy stiffness of the filament the loop 16 when first formed will have a relatively large radius at the free end (see Figure 1). In ordinary usage a line tied to this loop would shear the filament upon application of tension between the line and leader. The line for this purpose is usually of relatively small diameter and relatively great strength.

In accordance with the invention, after the loop 16 is thus formed, the leader is clamped between the jaws 11 and 12 of clamping device 10, with the knot 17 of loop 16 close to the jaws of the device and the loop projecting freely at one side thereof. The heating unit 15 is arranged and regulated with respect to the loop to heat the same to a temperature of about 150° C., or sufficient to soften the material to a point at which it is readily pliable or moldable. While the loop is maintained in softened condition, the narrow point of a suitable hooked implement 20 is engaged therethrough, and by pulling the implement outwardly of the clamping device 10 the loop is plied or molded to elongated shape, with opposite sides of the loop substantially close together in substantial parallelism and providing a relatively small rounded outer end the inner width of which approximates the diameter of a fishline or the like (not shown) to be attached to the loop. When the loop has been thus molded or plied to the desired elongated shape it is allowed to set or harden, by removing the same from the proximity of the heat of heater 15. The temperature at which the filament may be suitably plied may vary according to the linear polymer filament utilized. Also, in the case of nylon filament the temperature suitable for molding the loop is not necessarily exact, satisfactory results being obtainable within a temperature range of between 120° C. and 175° C.

In use of the improved leader for fishing the pull of a fishline (not shown), attached to the small rounded outer end of loop 16, will be transmitted to the leader 14, through the substantially straight or parallel opposite sides thereof, whereby alternate tightening and slackening of the fishline on the loop end will not cause any material degree of flexing of said sides of the loop at the point of contact with the fishline which would cause the loop material to break.

Means other than heater 15 may be utilized for heat-softening the leader loop. For example, the loop may be softened to desired consistency by immersion in a bath of hot oil immediately after which the leader is clamped in the vice to be operated upon as previously described.

Other modifications of the invention may be resorted to without departing from the spirit thereof or the scope of the appended claims.

What is claimed is:

1. A method of making fishline leaders which comprises providing a threadlike filament having characteristics of being relatively stiff but flexible and resilient and being heat-moldable but capable of withstanding temperatures substantially above 100° C. without materially softening, forming and tying a portion of said filament to provide a closed rounded loop, heating said looped portion to a temperature substantially above 100° C. to render the material thereof moldable, elongating the loop while in said heated state to mold the same with opposite sides of the loop substantially close together and in substantial parallelism, and allowing said loop to cool and set in said elongated molded condition.

2. A method of making fishline leaders which comprises providing a threadlike filament of a linear polyamide, forming and securing a closed rounded loop in a portion of said filament, heating said loop to a temperature substantially above 100° C. to render the material thereof moldable, elongating the loop while in said heated moldable state to mold the same with opposite sides of the loop substantially close together and in substantial parallelism, and allowing said heated loop to cool and set in said elongated molded condition.

3. A method of making fishline leaders which comprises providing a threadlike filament of a linear polyamide, tying a closed rounded loop in a portion of said filament, heating said loop to a temperature within range between 120° C. and 175° C. to render the material thereof moldable, elongating the loop while in said heated moldable state to mold the same with opposite sides of the loop substantially close together and in substantial parallelism, and allowing said heated loop to cool and set in said elongated molded condition.

4. A method of making fishline leaders which comprises providing a threadlike filament of a linear polyamide, tying a closed rounded loop in a portion of said filament, heating said loop to a temperature of approximately 150° C. to render the material thereof pliable, elongating the loop while in said heated pliable state to mold the same with opposite sides of the loop substantially close together and in substantial parallelism, and allowing said heated loop to cool and set in said elongated molded condition.

5. A method of making fishline leaders which comprises providing a threadlike filament of polyamide produced by the condensation of hexamethylene diamine and adipic acid, tying a closed rounded loop in said filament, heating said loop to a temperature of approximately 150° C. to render the material thereof moldable, elongating the loop while in said heated moldable state to mold the same with opposite sides of the loop substantially close together and in substantial parallelism, and allowing said heated loop to cool and set in said elongated molded condition.

6. A fishline leader of relatively stiff, springy threadlike filament, having the characteristic of being heat-moldable at temperatures substantially above normal temperatures of use of the leader as such, said filament having set therein an elongated closed loop defined by a relatively small rounded outer end and opposite sides extending from the same relatively closely together and in substantial parallelism, the inner width of said small rounded end approximating the diameter of a line or the like to be attached thereto, whereby in use of the leader the pull of said line or the like applied to said outer end of the loop is transmitted through said opposite sides of the loop without substantial flexing thereof.

7. A fishline leader of relatively stiff, springy threadlike filament, having the characteristic of being heat-moldable at temperatures substantially above 100° C., said filament having set therein an elongated closed loop extending freely from a knot in the filament, said elongated loop being defined by a relatively small rounded outer end and opposite sides extending from the same to the knot relatively closely together and in substantial parallelism, the inner width of said small rounded end approximating the diameter of a line or the like to be attached thereto, whereby in use of the leader the pull of said line or the like applied to said outer end of the loop is transmitted through said opposite sides of the loop without substantial flexing thereof.

8. Apparatus for making fishline leaders from relatively stiff, springy, threadlike filament, having the characteristic of being heat-moldable, comprising relatively fixed means for restraining the filament from one side of a closed rounded loop therein, means for heat-softening the loop, and a relatively movable element having a relatively narrow finger freely engageable through the loop, said element being relatively movable apart from said relatively fixed means with said finger within the loop engaging the opposite side thereof from said relatively fixed means to elongate the loop while in heat-softened condition.

FRED ARBOGAST.

REFERENCES CITED

The following references are of record in the file of this patent:

UNITED STATES PATENTS

| Number | Name | Date |
|---|---|---|
| 1,532,534 | Hewitt | Apr. 7, 1925 |
| 2,137,235 | Carothers | Nov. 22, 1938 |
| 2,157,119 | Miles | May 9, 1939 |
| 2,212,772 | Graves | Aug. 27, 1940 |
| 2,213,797 | Claussner | Sept. 3, 1940 |
| 2,225,135 | Skoverski | Dec. 17, 1940 |
| 2,292,905 | Smith | Aug. 11, 1942 |
| 2,333,503 | Worden | Nov. 2, 1943 |
| 2,377,928 | Fielitz et al. | June 12, 1945 |